US 6,599,955 B1

(12) United States Patent
Weikard et al.

(10) Patent No.: US 6,599,955 B1
(45) Date of Patent: Jul. 29, 2003

(54) RADIATION-CURABLE URETHANE ACRYLATES CONTAINING ISO-CYANATE GROUPS AND THEIR USE

(75) Inventors: Jan Weikard, Cologne (DE); Wolfgang Fischer, Meerbusch (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/713,742

(22) Filed: Nov. 15, 2000

(30) Foreign Application Priority Data

Nov. 23, 1999 (DE) .......................... 199 56 231

(51) Int. Cl.⁷ .......................... C09D 175/14; C08F 2/50
(52) U.S. Cl. .............................. 522/90; 522/92; 522/93; 522/96; 522/97; 522/107; 522/139; 522/140; 522/173; 522/174; 522/167
(58) Field of Search ............................ 522/96, 97, 107, 522/103, 173, 174, 92, 93, 167, 139, 140

(56) References Cited

U.S. PATENT DOCUMENTS

| | | | |
|---|---|---|---|
| 4,138,299 A | 2/1979 | Bolgiano | 204/159.16 |
| 4,173,682 A | 11/1979 | Noomen et al. | 428/423 |
| 4,393,187 A | 7/1983 | Boba et al. | 528/60 |
| 5,013,631 A * | 5/1991 | Su | 430/271.1 |
| 5,234,970 A | 8/1993 | Kyle | 522/96 |
| 5,459,196 A | 10/1995 | Kressdorf et al. | 524/591 |
| 5,684,081 A | 11/1997 | Dannhorn et al. | 524/507 |
| 6,177,535 B1 | 1/2001 | Schwalm et al. | 528/49 |
| 6,335,381 B1 * | 1/2002 | Hovestadt et al. | 522/173 |
| 6,500,876 B2 * | 12/2002 | Weikard et al. | 522/92 |

FOREIGN PATENT DOCUMENTS

| | | |
|---|---|---|
| DE | 3616434 | 11/1987 |
| EP | 549116 A2 | 6/1993 |
| EP | 964012 A1 | 12/1999 |

OTHER PUBLICATIONS

Database WPI, Week 9325, Derwent Publications Ltd., London, GB; AN 1993–197590, XP002176793, "One–part dual curing system for electronic applications" & CA 2 073 155 A (Kyle/Grace & Co), Jan. 17, 1993.

* cited by examiner

Primary Examiner—Susan W. Berman
(74) Attorney, Agent, or Firm—Joseph C. Gil; Thomas W. Roy

(57) ABSTRACT

The invention relates to radiation-curable coating composition containing:

a) 10 to 100 wt. % of a urethane (meth)acrylate which contains both (meth)acryloyl groups and free isocyanate groups, b) 0 to 90 wt. % of (meth)acrylates which contain (meth)acryloyl groups but no free isocyanate groups or any isocyanate-reactive groups,
the wt. % under a) and b) adding up to 100 wt. %, based on the weight of a)+b), and c) 0 to 10 wt. %, based on the sum of components a) and b) of a UV initiator for free radical polymerization.

The invention also relates to metal, plastic, film, wood, leather and mineral substrates coated with the above-mentioned radiation-curable coating composition.

5 Claims, No Drawings

RADIATION-CURABLE URETHANE ACRYLATES CONTAINING ISO-CYANATE GROUPS AND THEIR USE

BACKGROUND OF THE INVENTION

1. Field Of The Invention

The invention relates to radiation-curable urethane acrylates containing isocyanate groups and their use as coating compositions with a particularly good adhesion to the coated substrate.

2. Description Of The Prior Art

Coating compositions which can be cured by high-energy radiation have an advantage over thermosetting coating compositions because of the lower energy consumption for the curing and their higher rate of curing. Radiation-curable coating compositions can furthermore be applied without a solvent, any co-used reactive thinners which may be necessary being simultaneously co-polymerized. However, a disadvantage of radiation-curable coating compositions, in particular those based on ethylenically unsaturated acrylates, is the high volume shrinkage during curing. Due to this shrinkage, adhesion to the substrate, e.g. to metals (steel sheets, copper etc.) and certain types of wood, is often inadequate.

It was already known from DE-A 3,616,434 that radiation-curable binders cure to coatings which adhere well on difficult types of wood if the substrate has been coated beforehand with a primer of compounds containing isocyanate groups (adhesive base). The obvious disadvantage of this process, however, is an additional lacquering step for application of the primer. The known process of admixing a low amount of lacquer polyisocyanates to the binder has the disadvantage that after radiation curing the lacquer polyisocyanates remain free. These polyisocyanates then are bonded neither to the substrate nor the film and therefore are able to adversely influence the hardness of the film or leave the film. US-A 5,234,970 claims a composition comprising a) a compound containing isocyanate groups and ethylenically unsaturated groups,
b) reactive (meth)acrylate thinners and
c) if appropriate photoinitiators.

The disadvantage of this composition is that the reactive thinners b) contain OH groups, so that the stability of the composition in storage is limited even without any contact with atmospheric humidity.

One object of the present invention is therefore to provide coating compositions which can be cured by radiation and do not have the disadvantages mentioned for the prior art.

It has been found that certain urethane acrylates which contain free isocyanate groups can be cured by UV radiation on the substrates which are difficult to coat, such as certain woods, plastics and metals, to give coatings which adhere well.

These coating compositions contain almost no hydroxyl groups, so that they display high stability in storage in sealed vessels.

SUMMARY OF THE INVENTION

The invention relates to radiation-curable coating composition containing:

a) 10 to 100 wt. % of a urethane (meth)acrylate which contains both (meth)-acryloyl groups and free isocyanate groups,
b) 0 to 90 wt. % of (meth)acrylates which contain (meth)acryloyl groups but no free isocyanate groups or any isocyanate-reactive groups, the wt. % under a) and b) adding up to 100 wt. %, based on the weight of a)+b), and
c) 0 to 10 wt. %, based on the sum of components a) and b) of a UV initiator for free radical polymerization.

The invention also relates to metal, plastic, film, wood, leather and mineral substrates coated with the above-mentioned radiation-curable coating composition.

DETAILED DESCRIPTION OF THE INVENTION

Compounds a) are prepared from monohydric alcohols containing (meth)acryloyl groups and di- or polyisocyanates. Preparation processes for urethane (meth)acrylates are known and are described e.g. in DE-A 1,644,798, DE-A 2,115,373 or DE-A 2,737,406. For the urethane (meth)acrylates according to the invention containing free isocyanate groups, the equivalent ratio of NCO groups to OH groups is 1:0.2 to 1:0.8, preferably 1:0.3 to 1:0.6.

Monohydric alcohols containing (meth)acryloyl groups are understood as including both esters, containing a free hydroxyl group, of acrylic acid or methacrylic acid with dihydric alcohols, such as 2-hydroxyethyl, 2- or 3-hydroxypropyl or 2-, 3- or 4-hydroxybutyl (meth)acrylate, and mixtures of such compounds. Monohydric alcohols containing (meth)acryloyl groups or reaction products substantially containing such alcohols, which are obtained by esterification of n-hydric alcohols with (meth)acrylic acid, are also possible. It is also possible to employ mixtures of different alcohols, so that n represents an integer or a fractional number from 2 to 4, preferably 3(n-0.8) to (n-1.2), preferably (n-1) mol of (meth)acrylic acid is employed per mol of the alcohols mentioned. These compounds or product mixtures include the reaction products of i) glycerol, trimethylolpropane and/or pentaerythritol, low molecular weight alkoxylation products of such alcohols (such as ethoxylated or propoxylated trimethylolpropane, for example the addition product of ethylene oxide on trimethylolpropane of OH number 550), or of mixtures of such at least trihydric alcohols with dihydric alcohols (such as ethylene glycol or propylene glycol), with ii) (meth)acrylic acid in the molar ratio mentioned.

These compounds have a number-average molecular weight Mn of 116 to 1,000, preferably 116 to 750, and more preferably 116 to 158.

Suitable di- or polyisocyanates include aromatic, araliphatic, cycloaliphatic, and aliphatic compounds, aliphatic compounds being preferred. Examples include butylene-diisocyanate, hexamethylene-diisocyanate (HDI), isophorone-diisocyanate (IPDI), trimethylhexamethylene-diisocyanate (2,2,4- and/or 2,4,4-trimethylhexa-methylene-diisocyanate), neopentyl diisocyanate, dicyclohexylmethane-diisocyanate or 4-isocyanatomethyl-1,8-octane-diisocyanate and derivatives of these diisocyanates containing with a urethane, isocyanurate, allophanate, biuret, uretdione and/or iminooxadiazinedione groups. Di- or polyiso-cyanates which contain urethane groups and are based on di- or polyisocyanates and dihydric alcohols are also suitable.

The curing (addition reaction) can be accelerated in a known manner by means of suitable catalysts, such as, tin octoate, dibutyltin dilaurate or tertiary amines.

To increase the stability of the coating compositions according to the invention (e.g. towards premature polymerization and storage), 0.01 to 0.3 wt. %, based on the total weight of the reactants, of polymerization inhibitors or known antioxidants can be added to the reaction mixture. Suitable such additives are described e.g. in "Methoden der organischen Chemie" (Houben-Weyl), 4th edition, volume XIV/1, p. 433 et seq., Georg Thieme Verlag, Stuttgart 1961. Examples which may be mentioned include phenols, cresols and/or hydroquinones and quinones.

In a preferred variant, an oxygen-containing gas, preferably air, is passed through the reaction mixture during the preparation in order to prevent undesirable poly-merization of the (meth)acrylates.

The components mentioned under b) are (meth)acrylates which contain (meth)-acryloyl groups but no free isocyanate groups nor any isocyanate-reactive groups. Such binders are described, for example, in P.K.T. Oldring (ed.), Chemistry & Technology of UV & EB Formulations for Coatings, Inks & Paints, vol. 2, 1991, SITA Technology, London p. 31–235. Examples which may be mentioned include urethane acrylates, certain polyester acrylates and certain polyether acrylates.

The binders according to the invention can also be employed in a form diluted by solvents. Examples of suitable solvents include acetone, 2-butanone, ethyl acetate, n-butyl acetate, methoxypropyl acetate or low molecular weight esters of (meth)acrylic acid. Such mono-, di- or oligoesters of (meth)acrylic acid are known compounds in coating technology and are called reactive thinners and, as compounds which polymerize in during curing, lower the viscosity of the non-cured coating. Such compounds are described in P.K.T. Oldring (ed.), Chemistry & Technology of UV & EB Formulations for Coatings, Inks & Paints, vol. 2, 1991, SITA Technology, London p. 237–235. Examples include the esters of acrylic acid or methacrylic acid, preferably acrylic acid, with mono-, di-, tri- and polyalcohols. Suitable monohydric alcohols (monoalcohols) include the isomeric butanols, pentanols, hexanols, heptanols, octanols, nonanols and decanols; cycloaliphatic alcohols such as isobomol, cyclohexanol and alkylated cyclohexanols and dicyclopentanol; aryl-aliphatic alcohols such as phenoxyethanol and nonylphenylethanol; and tetrahydrofurfuryl alcohols. Alkoxylated derivatives of these alcohols can furthermore be used.

Suitable dihydric alcohols (dialcohols) include alcohols such as ethylene glycol, propane-1,2-diol, propane-1,3-diol, diethylene glycol, dipropylene glycol, the isomeric butanediols, neopentylglycol, hexane-1,6-diol, 2-ethylhexanediol, tripropylene glycol, and alkoxylated derivatives of these alcohols. Preferred dihydric alcohols are hexane-1,6-diol, dipropylene glycol and tripropylene glycol.

Suitable triihydric alcohols (trialcohols) are e.g. glycerol, trimethylolpropane and alkoxylated derivatives thereof. Propoxylated glycerol is preferred.

Suitable polyhydric alcohols (polyalcohols) include pentaerythritol, ditrimethylolpropane or alkoxylated derivatives thereof.

All constituents of component b) must be free from groups which are reactive with NCO groups under the preparation and storage conditions. Based for example on hydroxyl groups this means that the OH content of b) should be less than 10 and preferably less than 5 mg KOH/g.

A photoinitiator component c) can be added for the curing by UV radiation. Examples include known initiators that can trigger a free radical polymerization after irradiation with high-energy radiation, including UV light.

Such photoinitiators are described, for example, in P.K.T. Oldring (ed.), Chemistry & Technology of UV & EB Formulations for Coatings, Inks & Paints, vol. 2, 1991, SITA Technology, London p. 61–325. Those initiators which contain no groups which are reactive towards isocyanate groups, for example benzil dimethyl ketal and bisacylphosphine oxides, are preferred.

The coating compositions according to the invention can be mixed with known additives. These include fillers, pigments, dyestuffs, thixotropic agents, leveling agents, matting agents or flow agents, which are employed in the conventional amounts.

The coating system according to the invention can preferably be applied via spray, casting or roller application.

The coating system according to the invention is used for coating wood, film, plastics, leather, mineral substrates, metals (such as metal sheets, which may also be pretreated, and copper, for example in the form of wires) and substrates which have already been lacquered or coated. Particularly good results compared with systems according to the prior art are obtained on metal substrates and woods such as teak and mahogany.

Curing of the coatings according to the invention is carried out:

1. Optionally by allowing added solvent to evaporate. This is carried out at room temperature, optionally elevated temperature, preferably up to 80° C. An increase in temperature may also be advantageous in order to obtain an even better adhesion of the coating composition to the substrate.
2. By UV curing, for which commercially available high- or medium-pressure mercury lamps are suitable; these lamps can also be doped by other elements and preferably have an output of 80 to 240 W/cm lamp length. Films with solid surfaces which can be handled are formed after UV curing.
3. Optionally by crosslinking the NCO-containing constituents by means of moisture or with reactive groups in the substrate. This can be carried out at room temperature or elevated temperature, advantageously at 60 to 150° C. If an after-treatment at elevated temperature is omitted, the final properties of the system are established only after some time, approx. 3 to 7 days.

EXAMPLES

1. Preparation of the Urethane Acrylates (Constituent a)
Urethane Acrylate A Containing Isocyanate Groups:

552.0 g Desmodur N 3600 (commercial product of Bayer AG, Leverkusen, polyisocyanate substantially containing HDI isocyanurates, NCO content: 23.4 wt. %, viscosity 1,200 mPa.s at 23° C.) were initially introduced into a reaction vessel. 1.6 g 2,6-di-tert-butyl-4-methyl-phenol were added. The solution was heated to 60° C. while passing air through and stirring. The heating source was removed and 116.0 g 2-hydroxyethyl acrylate were added dropwise such that the temperature was between 55 and 65° C. Thereafter, the reaction was continued at 60° C. until the NCO content was below 12.5%. The resulting product had a dynamic viscosity at 23° C. of 12 Pa.s.

Urethane Acrylate B Containing Isocyanate Groups:

418.4 g Desmodur HL (commercial product of Bayer AG, Leverkusen, polyisocyanate substantially containing TDI and HDI isocyanurates, NCO content: 10.5 wt. %, viscosity 2,200 mPa.s at 23° C. and 60% in butyl acetate) and butyl acetate at a 40% solids content in the product were initially introduced into the reaction vessel. 1.0 g 2,6-di-tert-butyl-4-methyl-phenol was added. The solution was heated to 60° C. while passing air through and stirring. The heating source was removed and 81.7 g 2-hydroxyethyl acrylate were added dropwise such that the temperature was between 55 and 65° C. Thereafter, the reaction was continued at 60° C. until the NCO content was below 5.0%. The resulting product had a dynamic viscosity at 23° C. of 22 Pa.s.

2. Constituent b)

Commercially obtainable compounds were used: Urethane acrylate C: Roskydal UA VP LS 2265 (Bayer AG Leverkusen aliphatic urethane acrylate free from reactive thinner, viscosity 800 mPa.s at 23° C.), OH content<5mg KOH/g. Urethane acrylate D: Roskydal® UA VP LS 2308 (Bayer AG Leverkusen, aliphatic urethane acrylate 80% in hexanediol diacrylate, Viscosity 34,000 mPa.s at 23° C.), OH content<5 mg KOH/g.

3. Mixing and application of the coatings:

| Example | Urethane (meth)-acrylate containing NCO groups (letter/parts by wt.) | (Meth)acrylates free from NCO groups (letter/parts by wt.) | Photoinitiator (Ciba Spezialitätenchemie) (type/parts by wt.) |
|---|---|---|---|
| 1 | A/100 | — | Darocur 1173/3 |
| 2 | A/50 | D/50 | Darocur 1173/3 |
| 3 (comparison) | — | D/100 | Darocur 1173/3 |
| 4 | A/50 | C/50 | Darocur 1173/3 |
| 5 | B/70 | C/30 | Darocur 1173/3 |
| 6 (comparison) | — | C/100 | Darocur 1173/3 |

The formulations according to the invention from examples 1 and 2 and comparison example 3 were knife-coated on to untreated steel sheets (Unibond WH/600/OC) in layer thicknesses of 50 μm. They were then cured by means of a high-pressure mercury lamp (80 W/cm lamp length) at a belt speed of 3 m/min. Scratch- and chemical-resistant coatings were formed. After 24 h, the adhesion to the substrate was determined by the cross-hatch/adhesive tape test.

Result:

Example 1: The lacquer adhered. No lacquer was detached from the steel sheet with the adhesive tape.

Example 2: The lacquer adhered moderately. Some lacquer was detached with the adhesive tape.

Example 3: The lacquer did not adhere. The lacquer was detached completely (comparison) from the sheet with the adhesive tape.

The formulations according to the invention examples 4 and 5 and comparison example 6 were knife-coated onto teak wooden boards in layer thicknesses of 50 μm. They were then cured by means of a high-pressure mercury lamp (80 W/cm lamp length) at a belt speed of 3 m/min. Scratch- and chemical-resistant coatings were formed. After 24 h the adhesion to the substrate was determined by the crosshatch/adhesive tape test.

Result:

Example 4: The lacquer adhered. No lacquer was detached from the wood with the adhesive tape.

Example 5: The lacquer adhered moderately to well. Some lacquer was detached with the adhesive tape.

Example 6: (Comparison) The lacquer adhered poorly. The lacquer was detached almost completely from the wood with the adhesive tape.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A radiation-curable coating composition consisting essentially of:

a) from 10 to 70 percent by weight of a urethane (meth) acrylate which contains both (meth)acryloyl groups and free isocyanate groups, b) from 30 to 90 percent by weight of (meth)acrylates which contain (meth)acryloyl groups but contains no free isocyanate groups and no isocyanate-reactive groups, wherein said (meth)acrylates are selected from the group consisting of urethane acrylates, polyester acrylates and polyether acrylates, the weight percents being based on the combined-weight of components a) and b) and wherein the percents by weight of components a) and b) totals 100%, and c) from 0 to 10 percent by weight, based on the weight of components a) and b) of a UV initiator for free-radical polymerization.

2. The composition of claim 1, consisting essentially of a) from 10 to 50 percent by weight of component a) and from 50 to 90 percent by weight of component b).

3. The composition of claim 1, wherein component b) is a urethane acrylate.

4. A metal, plastic, film, wood, leather or mineral substrate coated with the radiation cured coating of claim 1.

5. In a process for preparing a coated substrate by first coating the substrate with a coating composition and thereafter curing the composition, the improvement wherein the coating composition consists essentially of a) from 10 to 70 percent by weight of a urethane (meth) acrylate which contains both (meth)acryloyl groups and free isocyanate groups, b) from 30 to 90 percent by weight of (meth)acrylates which contain (meth)acryloyl groups but contains no free isocyanate groups and no isocyanate-reactive groups, wherein said (meth)acrylates are selected from the group consisting of urethane acrylates, polyester acrylates and polyether acrylates, the weight percents being based on the combined weight of components a) and b) and wherein the percents by weight of components a) and b) totals 100%, and c) from 0 to 10 percent by weight, based on the weight of components a) and b) of a UV initiator for free-radical polymerization.

* * * * *